(12) United States Patent
Chen et al.

(10) Patent No.: US 7,717,588 B1
(45) Date of Patent: May 18, 2010

(54) LIGHT GENERATION DEVICE FOR PROJECTOR

(75) Inventors: Lung Chen, Hu-Kou (TW); Hui-Hsiang Feng, Hu-Kou (TW); Siou-Ming Chen, Hu-Kou (TW); Ya-Chuan "Eve" Yeh, Hu-Kou (TW)

(73) Assignee: Arclite Optronics Corporation, Hsin Chu County (TW)

( * ) Notice: Subject to any disclaimer, the term of this patent is extended or adjusted under 35 U.S.C. 154(b) by 0 days.

(21) Appl. No.: 12/332,369

(22) Filed: Dec. 11, 2008

(51) Int. Cl.
*F21V 14/00* (2006.01)

(52) U.S. Cl. ........................ 362/256; 362/255; 362/328

(58) Field of Classification Search ................ 362/255, 362/256, 327–329, 298, 299, 302–305, 263; 313/110, 111, 113, 116
See application file for complete search history.

(56) References Cited

U.S. PATENT DOCUMENTS

| 6,246,170 B1 * | 6/2001 | Sugawara | 313/570 |
| 6,945,681 B2 * | 9/2005 | Larsen | 362/510 |
| 2006/0056184 A1 * | 3/2006 | Takezawa et al. | 362/299 |
| 2006/0152688 A1 * | 7/2006 | Chen et al. | 353/98 |

* cited by examiner

*Primary Examiner*—Thomas M Sember
(74) *Attorney, Agent, or Firm*—Leong C. Lei

(57) ABSTRACT

The light generation device contains a bowl-shaped reflection member for light focusing, a gas-discharge light bulb inside the reflection member, and a lens element positioned on the light bulb blocking the light beams emitted towards a front opening of the reflection member. In one embodiment, the lens element has a curved front surface so that incident light beams are refracted and redirected toward a focus point of the reflection member. In another embodiment, the lens element has a curved back surface of a specific curvature so that light beams traveling towards the lens element are reflected and redirected towards the reflection member which in turn are reflected again and focused by the reflection member.

2 Claims, 4 Drawing Sheets

LIGHT GENERATION DEVICE FOR PROJECTOR

TECHNICAL FIELD OF THE INVENTION

The present invention generally relates to projectors, and more particularly to a light generation device for projectors.

DESCRIPTION OF THE PRIOR ART

A conventional light generation device of a projector, as shown in FIG. 1, contains a gas-discharge light bulb 1 inside a bowl-like reflection member 2. Through the specific curvature of the reflection member 2, a portion of the light beams emanated from the light bulb 1 (denoted by the dashed lines) are focused for enhanced brightness. On the other hand, since the light bulb 1 is almost omnidirectional, some of the light beams are emitted directly out of the reflection member 2 without being reflected and focused by the reflection member 2. These light beams are considered ineffective as they contribute little to the brightness of the light generation device.

To harness these ineffective light beams, the present inventor provides a teaching in Republic of China, Taiwan, Patent No. M324280 where a light guiding element is positioned on the paths of the ineffective light beams to redirect these light beams.

SUMMARY OF THE INVENTION

A novel light generation device for a projector is provided herein which utilizes a lens element to harness originally ineffective light beams by refraction or reflection so as to achieve significantly improved brightness.

The light generation device contains a bowl-shaped reflection member for light focusing, a gas-discharge light bulb inside the reflection member, and a lens element positioned on the light bulb blocking the light beams emitted directly from the light bulb towards a front opening of the reflection member.

In one embodiment, the lens element has a curved front surface that bulges towards the front opening of the reflection member with a specific curvature so that incident light beams are refracted and redirected toward a focus point of the reflection member. In another embodiment, the lens element has a curved back surface concaved towards the front opening of the reflection member. The curved surface has a specific curvature so that light beams traveling towards the lens element are reflected and redirected towards the reflection member which in turn are reflected again and focused by the reflection member.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

According to a first embodiment of the present invention, the light generation device contains a bowl-shaped reflection member 10 for light focusing, a gas-discharge light bulb 20 inside the space surrounded by the reflection member 10, and a lens element 30 positioned on the light bulb 20 blocking the light beams emitted directly from the light bulb 20 towards a front opening of the reflection member 10. Please note that the lens element 30 has a curved front surface 31 for redirecting light beams passing through it.

Figure 1:
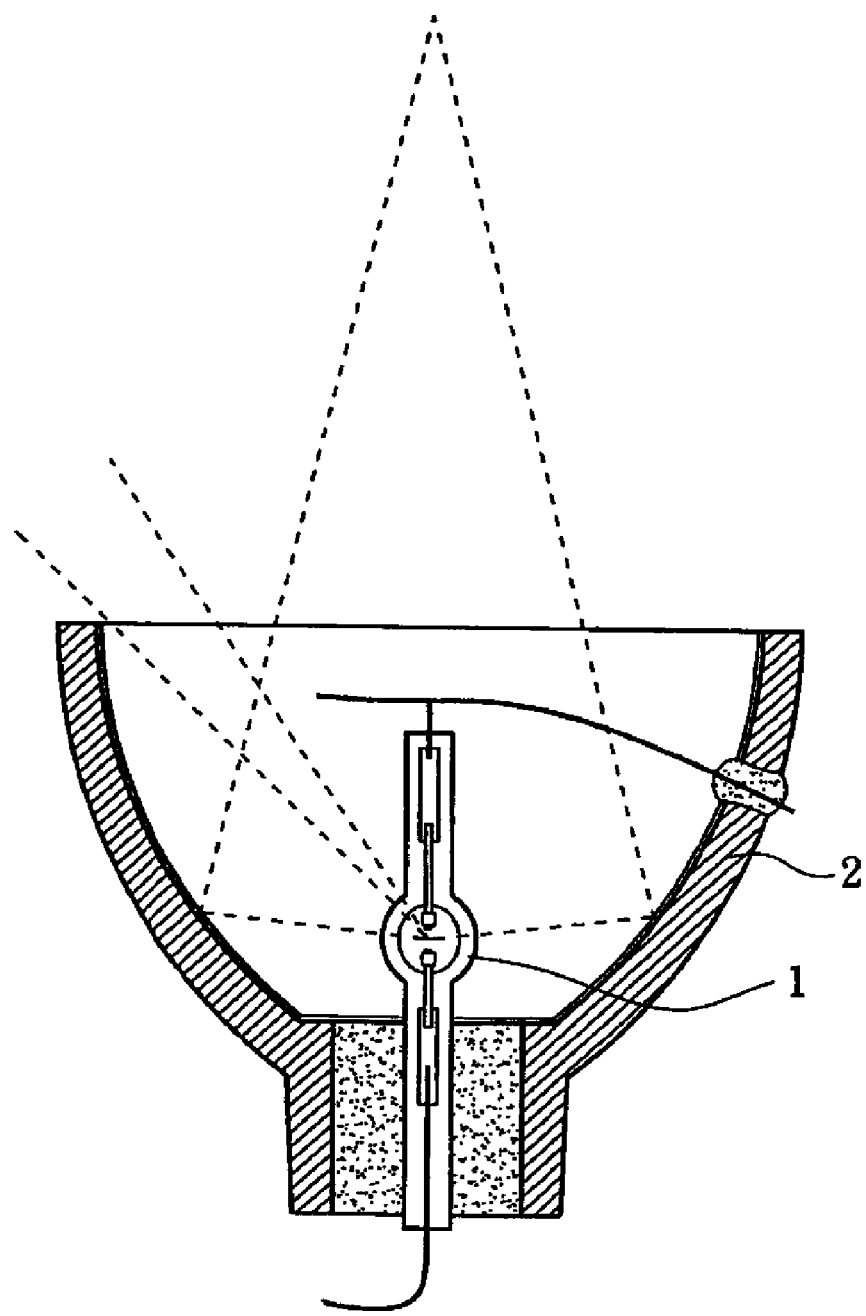
FIG. 1 is a schematic diagram showing a conventional light generation device of a projector.
Figure 2:
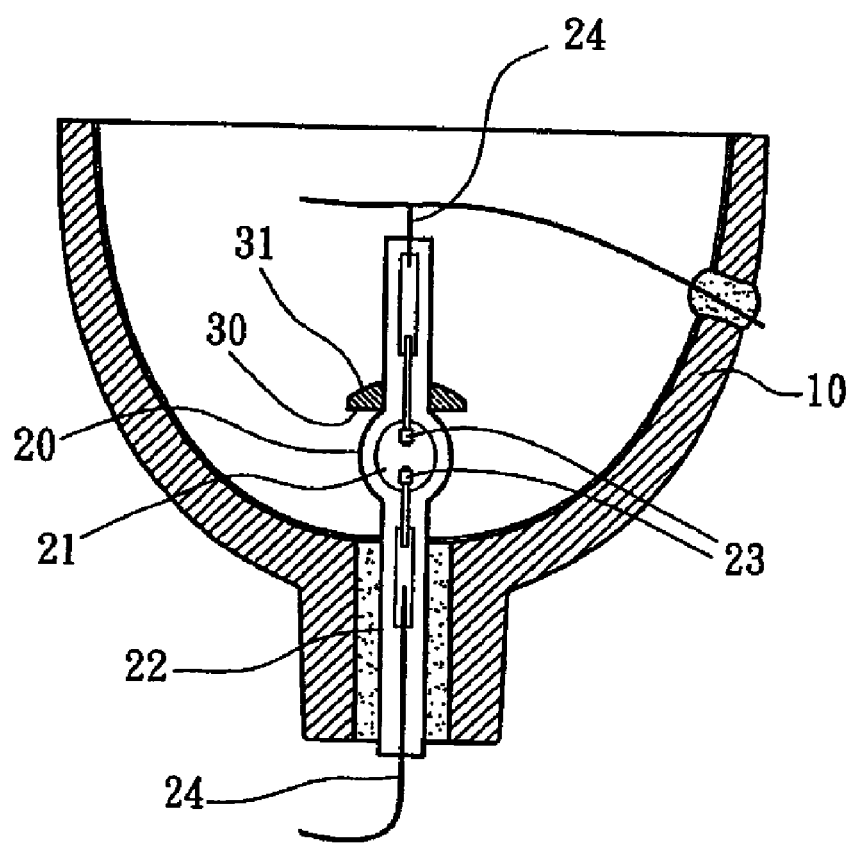
FIG. 2 is a schematic diagram showing a light generation device according to a first embodiment of the present invention.
Figure 3:
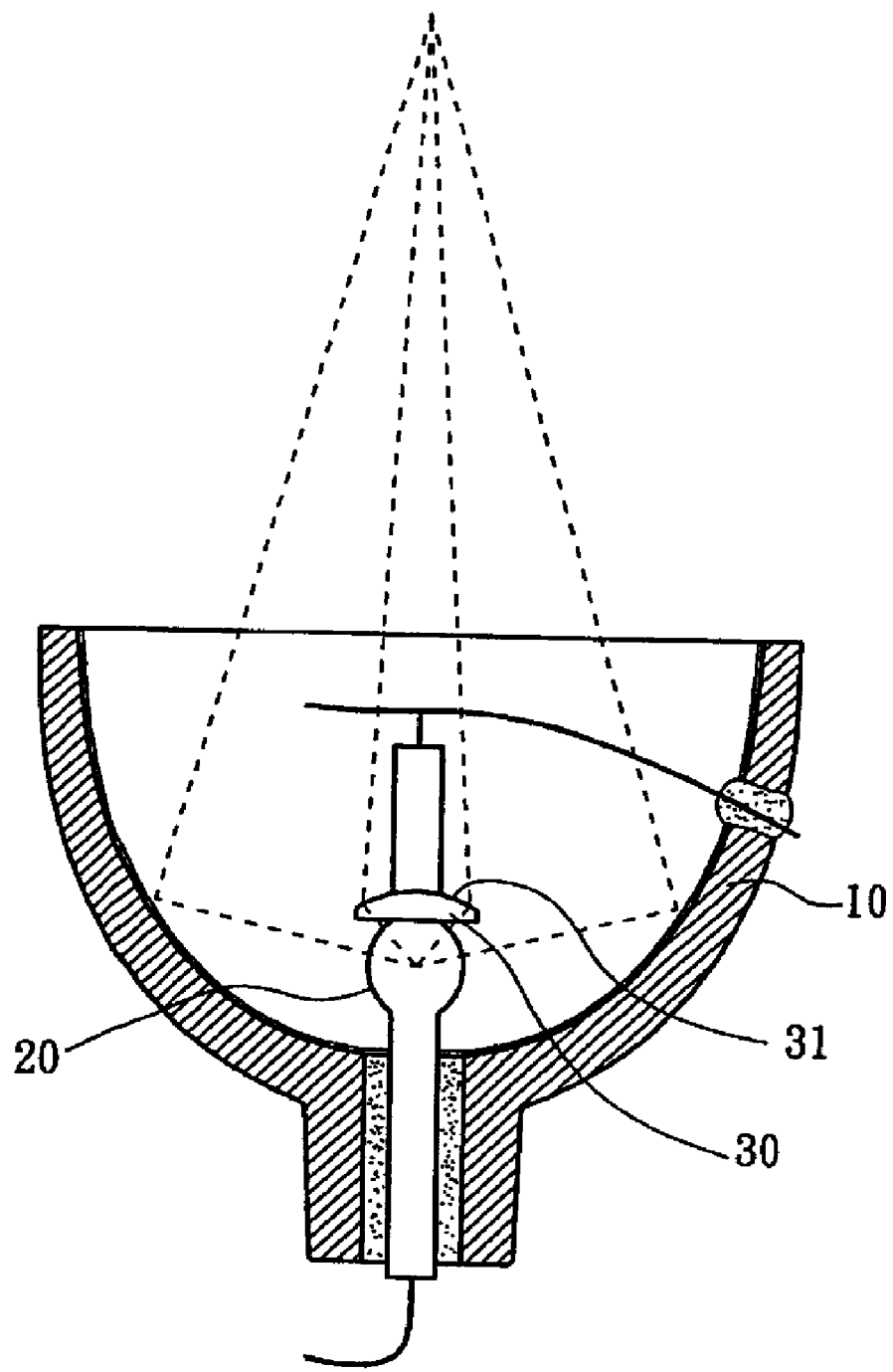
FIG. 3 is a schematic diagram showing the trajectories of light beams emanated from the light generation device of FIG. 2.

The light bulb 20 contains a spherical discharge chamber 21 where a filler such as metal halide, mercury, or inert gas and two electrodes 23 connected by respective conducting wires 24 are housed. The discharge chamber 21 is positioned at an end of a discharge tube 22 having the other end joined to the reflection member 10. As further shown in FIG. 3, the lens element 30 is firmly attached to a front side of the discharge chamber 21 by welding, adhesion, or some fastening means. The lens element 30 has a curved front surface 31 that bulges towards the front opening of the reflection member 10 with a specific curvature so that incident light beams are refracted and redirected toward a focus point of the reflection member 10.

Figure 4:
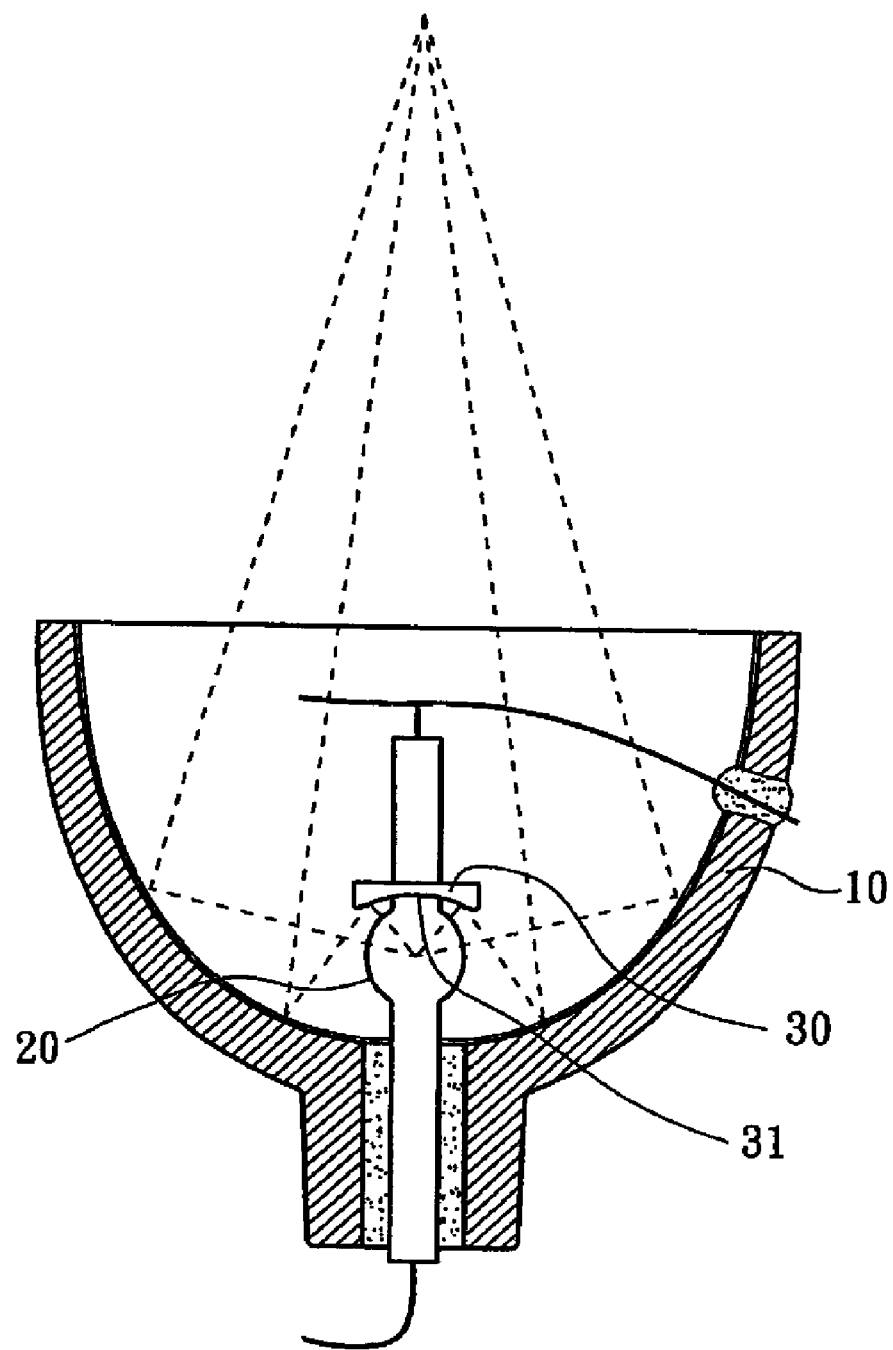
FIG. 4 is a schematic diagram showing a light generation device according to a second embodiment of the present invention.

FIG. 4 shows another embodiment of the present invention. The difference from the previous embodiment lies in the lens element 30. In the present embodiment, the lens element 30 has the curved surface 31 arranged on a back side that is immediately adjacent to the discharge chamber 21 and concaved towards the front opening of the reflection member 10. Again, the curved surface 31 has a specific curvature so that light beams traveling towards the lens element 30 are reflected and redirected towards the reflection member 10. These light beams are then reflected again and focused by the reflection member 10.

According the foregoing description, both embodiments are capable of fully utilizing all light beams produced by the gas-discharge light bulb and focusing them to achieve enhanced brightness.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A light generation device, comprising:
a bowl-shaped reflection member having a front opening;
a gas-discharge light bulb having a discharge tube and a spherical discharge chamber disposed at an intermediate portion of said discharge tube, said discharge tube having an end extending through a center of a bottom of said bowl-shaped reflection member, said spherical discharge chamber being provided with two electrodes connected by respective conducting wires; and
a lens element mounted on said gas-discharge light bulb and positioned above said spherical discharge chamber to block light beams emitted directly from said spherical discharge chamber towards said front opening of said bowl-shaped reflection member, said lens having a curved surface which bulges towards said front opening of said bowl-shaped reflection member for causing light beams incident into said lens element to be refracted and redirected toward a focus point of said bowl-shaped reflection member.

2. The light generation device according to claim 1, wherein said spherical discharge chamber contains a filler selected from metal halide, mercury, or inert gas.

* * * * *